UNITED STATES PATENT OFFICE.

HAROLD HIBBERT, OF MOUNT VERNON, NEW YORK, ASSIGNOR TO THE COMMERCIAL RESEARCH COMPANY, A CORPORATION OF NEW YORK.

PURIFICATION OF ACETYL-SALICYLIC ACID.

1,321,307. Specification of Letters Patent. Patented Nov. 11, 1919.

No Drawing. Application filed April 8, 1916, Serial No. 89,934. Renewed May 11, 1918. Serial No. 234,018.

*To all whom it may concern:*

Be it known that I, HAROLD HIBBERT, a subject of Great Britain, residing at Mount Vernon, county of Westchester, and State of New York, have invented certain new and useful Improvements in the Purification of Acetyl-Salicylic Acid; and I do hereby declare the following to be a full, clear, and exact description of the invention, such as will enable others skilled in the art to which it appertains to make and use the same.

This invention relates to the purification of acetyl salicylic acid and to the recovery of a product of high purity from the impure product of acetylation in a particularly advantageous manner.

It has heretofore been the common practice in the art to effect the purification of impure acetyl salicylic acid by recrystallization from chloroform. The solubility of the acetyl salicylic acid in chloroform is, however, relatively small, amounting, at the boiling point of chloroform, to only about 12½ parts in 100 parts of the solvent.

I have now discovered that materially improved results may be obtained in effecting the purification by dissolving the impure product in a heated dichlorinated olefin hydrocarbon or in a mixture of such hydrocarbons, and by recovering the acetyl salicyclic acid in a purified state by recrystallization on cooling.

Among the dichlorinated olefin hydrocarbons may be mentioned ethylene dichlorid itself, or other individual dichlorinated olefin hydrocarbons. Of particular value is the mixture of dichlorinated olefin hydrocarbons obtainable from oil gas by chlorination. Such a mixture is made up largely of ethylene dichlorid but contains also, in considerable amounts, propylene dichlorid and usually butylene dichlorid, together with other chlorinated hydrocarbons in smaller amounts. This mixture of chlorinated hydrocarbons can be readily produced in considerable amounts and at little expense, from oil gas. Ethylene dichlorid also is easily obtainable, for example, by converting ethyl alcohol into ethylene and chlorinating the ethylene to form the dichlorinated derivative. Propylene, butylene, and amylene dichlorids can similarly be produced and used, either in an isolated state or in intermixture of two or more of the dichlorinated compounds.

It has been found that a mixture of such dichlorinated olefins having a boiling point of about 82°–90° C. will dissolve approximately three times as much acetyl salicylic acid at its boiling point as will chloroform, while the solubility of acetyl salicylic acid in the cold mixture is as low or even lower than the solubility in chloroform. It has thus been found that 100 parts by weight of the solvent of a boiling point of 82°–85° C. will dissolve up to 36 parts by weight or even more of the acetyl salicylic acid; whereas chloroform, in equal amount, will dissolve only about 12 to 13 parts at its boiling point.

It is a further advantage of the process of the present invention that the impurities of the impure acetyl salicylic acid are even more soluble in the cold dichlorinated olefin hydrocarbon solvent than in chloroform. The impurities incident to the acetylation process are usually glacial acetic acid, acetic anhydrid and salicylic acid. The dichlorinated olefin hydrocarbon solvent is miscible with acetic acid and acetic anhydrid in all proportions, while the solubility of salicylic acid in the cold solvent is materially greater than its solubility in chloroform.

In practising the invention, the acetyl salicylic acid produced by acetylation of salicylic acid is dissolved in the dichlorinated olefin hydrocarbon solvent, preferably at the boiling point of such solvent, and the purified acetyl salicylic acid is recovered by crystallization on cooling. Owing to the materially greater solubility in the solvent at the boiling point (about 300% greater than that in boiling chloroform), it becomes possible to obtain materially increased yields of the purified acetyl salicylic acid working with much smaller amounts of the solvent; while the greater solubility of salicylic acid itself in the solvent after cooling is a further advantage incident to the purification process.

It has been found further that the dichlorinated-ethylene hydrocarbons exert no objectionable hydrolyzing action tending to split off acetic acid with the formation of salicylic acid. This fact, together with the greater solubility of salicylic acid in the cold solvent, enables the salicylic acid present as an impurity in the impure acetyl salicylic acid to be readily removed.

The advantages of the invention are particularly marked in the manufacture and purification of acetyl salicylic acid on a commercial scale because of the materially increased output possible by the use of apparatus of a given size and by the use of a given amount of the solvent.

What I claim is:

1. The method of effecting the removal of impurities from acetyl salicylic acid, which comprises dissolving the impure product resulting from the acetylation in a heated dichlorinated olefin hydrocarbon solvent, and recovering the purified acetyl salicylic acid therefrom by crystallization on cooling; substantially as described.

2. The method of effecting the removal of impurities from acetyl salicylic acid, which comprises dissolving the impure product resulting from the acetylation in a heated dichlorinated olefin hydrocarbon solvent containing ethylene dichlorid, and recovering the purified acetyl salicylic acid therefrom by crystallization on cooling; substantially as described.

3. The method of effecting the removal of impurities from acetyl salicylic acid, which comprises dissolving the impure product resulting from the acetylation in a heated dichlorinated olefin hydrocarbon solvent made up of a mixture of a plurality of dichlor derivatives of olefins containing not more than 5 carbon atoms, and recovering the purified acetyl salicylic acid therefrom by crystallization on cooling; substantially as described.

4. The method of effecting the removal of impurities from acetyl salicylic acid, which comprises dissolving the impure product resulting from the acetylation in a heated dichlorinated olefin hydrocarbon solvent resulting from the chlorination of oil gas, and recovering the purified acetyl salicylic acid therefrom by crystallization on cooling; substantially as described.

5. The method of effecting the removal of impurities from acetyl salicylic acid, which comprises dissolving the impure product resulting from the acetylation in a heated dichlorinated olefin hydrocarbon solvent consisting of ethylene dichlorid, and recovering the purified acetyl salicylic acid therefrom by crystallization on cooling; substantially as described.

In testimony whereof I affix my signature

HAROLD HIBBERT.